United States Patent [19]

Cohen

[11] 4,267,103

[45] May 12, 1981

[54] SOLVENT POLYMERIZATION OF CARBOXYL CONTAINING MONOMERS

[75] Inventor: Louis Cohen, Avon Lake, Ohio

[73] Assignee: The B. F. Goodrich Company, Akron, Ohio

[21] Appl. No.: 967,447

[22] Filed: Dec. 7, 1978

[51] Int. Cl.$^3$ .................. C08F 2/06; C08L 1/02; C08L 1/00

[52] U.S. Cl. .................. 260/17.4 UC; 260/17.4 SG; 526/208; 526/209; 526/212; 526/216; 526/240; 526/303; 526/317; 526/923

[58] Field of Search ............. 526/240, 317, 208, 209, 526/216, 303, 923, 212; 260/17.4 UC, 17.4 SG

[56] References Cited

U.S. PATENT DOCUMENTS

| | | | |
|---|---|---|---|
| 2,244,703 | 6/1941 | Hubbuch | 526/317 |
| 2,878,237 | 3/1959 | Russell et al. | 526/317 |
| 3,025,219 | 3/1962 | Maeder | 526/212 |
| 3,336,269 | 8/1967 | Monage et al. | 526/212 |
| 3,379,702 | 4/1968 | Spivey | 526/212 |
| 3,479,284 | 11/1969 | Lees | 526/212 |
| 3,509,113 | 4/1970 | Monagle et al. | 526/212 |
| 3,850,898 | 11/1974 | Ide et al. | 526/317 |
| 3,872,063 | 3/1975 | Kim | 526/240 |
| 3,919,140 | 11/1975 | Hirata | 526/216 |
| 3,970,633 | 7/1976 | Miller et al. | 526/240 |
| 4,028,290 | 6/1977 | Reid | 260/17.4 ST |
| 4,062,817 | 12/1977 | Westerman | 526/15 |
| 4,066,522 | 1/1978 | Machi et al. | 526/216 |
| 4,066,583 | 1/1978 | Spaulding | 260/17.4 SG |
| 4,158,726 | 6/1979 | Kamada et al. | 526/292 |
| 4,167,464 | 9/1979 | George | 526/240 |

OTHER PUBLICATIONS

Chem. Abs. 26363t, vol. 81, (1974), "Sparingly Cross-linked Acrylic Acid Copolymers", Naumov et al.

*Primary Examiner*—Joseph L. Schofer
*Assistant Examiner*—Herbert J. Lilling
*Attorney, Agent, or Firm*—J. Hughes Powell, Jr.

[57] ABSTRACT

Carboxyl or carboxyl salt containing polymers are prepared by polymerizing carboxyl containing monomers wherein greater than one percent of the carboxyl groups are neutralized with an alkali, ammonia or an amine, optionally copolymerized with other vinylidene monomers containing at least one terminal $CH_2=CH<$ group dissolved in a solvent for the monomers which is a non-solvent for the polymer with a free radical catalyst, so that the resulting polymer is obtained suspended as a fine, readily recoverable substantially non-swollen fine powder. The solvents used are moderately to strongly hydrogen bonded and have solubility parameters of from about 8 to 15.

24 Claims, No Drawings

SOLVENT POLYMERIZATION OF CARBOXYL CONTAINING MONOMERS

BACKGROUND OF THE INVENTION

Carboxyl containing polymers of vinylidene monomers containing at least one terminal $CH_2=C<$ group are known. Such polymers may be homopolymers of an unsaturated, polymerizable carboxylic monomer such as acrylic acid, maleic acid, itaconic acid and the like, or copolymers thereof. Typical materials are those described in U.S. Pat. No. 2,798,053. For example, copolymers of acrylic acid with small amounts of polyalkenyl polyether cross-linkers are gel-like polymers which, especially in the form of their salts, absorb large quantities of water or solvents with subsequent substantial increase in volume. Other useful carboxyl containing polymers are described in U.S. Pat. No. 3,940,351, directed to polymers of unsaturated carboxylic acid and at least one acrylic or methacrylic ester where the alkyl group contains 10 to 30 carbon atoms which are efficient thickening agents in aqueous solutions, even in the presence of substantial amounts of inorganic salts. Other types of such copolymers are described in U.S. Pat. No. 4,062,817 wherein the polymers described in U.S. Pat. No. 3,940,351 contain additionally another acrylic or methacrylic ester and the alkyl groups contain 1 to 8 carbon atoms. It is difficult to polymerize such materials in the usual solvents, because of swelling and gel formation, and such materials have normally been prepared in hydrocarbons and chlorinated hydrocarbons, for example, benzene, xylene, tetralin, hexane, heptane, carbon tetrachloride, methyl chloride, ethyl chloride and the like. Polymerizations are disclosed, for example, in 4,062,817 wherein the polymerizations are desirably conducted in the presence of haloethane or halomethane, preferably containing at least 4 halogen atoms. For example, 1,1,2-trichloro-1,2,2-trifluoro-ethane. Other carboxyl containing polymers prepared in similar systems include those described in U.S. Pat. No. 3,915,921 and 4,066,583. A number of solvents used and suggested in the prior art are toxic. An improved method for preparing and easily recovering the carboxylic containing polymers in non-toxic colymerization systems is desired. In the past the requirement that the polymerizing solvent should not swell the precipitated polymer for ease of polymer recovery has limited the use of solvents to non-polar or slightly polar solvents having low solubility parameters.

SUMMARY OF THE INVENTION

Carboxyl or carboxyl salt containing polymers are prepared by polymerizing carboxyl containing monomers wherein greater than one weight percent of the carboxyl groups of the monomers are neutralized with an alkali, ammonia, or amine; optionally copolymerized with other vinylidene monomers containing at least one terminal $CH_2=CH<$ group, dissolved in a solvent for the monomers which is a non-solvent for the polymers, so that the resulting polymer is obtained in powder form, said solvents being moderate to strongly hydrogen bonded solvents having solubility parameters of greater than about 8 up to about 15.

DETAILED DESCRIPTION

The polymers that may be prepared in accordance with this invention are carboxyl containing polymers having molecular weights greater than about 500 to several million, usually greater than about 10,000 to 900,000 or more.

The carboxylic monomers useful in the production of the polymers of this invention are the olefinically-unsaturated carboxylic acids containing at least one activated carbon-to-carbon olefinic double bond, and at least one carboxyl group, that is, an acid containing an olefinic double bond which readily functions in polymerization because of its presence in the monomer molecule, either in the alpha-beta position with respect to a carboxyl group thusly,

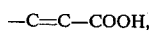

or as a part of a terminal methylene grouping thusly, $CH_2=C<$. The presence of a terminal methylene grouping in a carboxylic monomer makes this type of compound much more easily polymerizable than if the double bond were intermediate in the carbon structure. Olefinically-unsaturated acids of this class include such materials as the acrylic acids typified by the acrylic acid itself, methacrylic acid, ethacrylic acid, alpha-chloroacrylic acid, alpha-cyano acrylic acid, beta methylacrylic acid (crotonic acid), alpha-phenyl acrylic acid, beta-acryloxy propionic acid, sorbic acid, alpha-chloro sorbic acid, angelic acid, cinnamic acid, p-chloro cinnamic acid, beta-styryl acrylic acid (1-carboxy-4-phenyl butadiene-1,3), itaconic acid, citraconic acid, mesaconic acid, glutaconic acid, aconitic acid, maleic acid, fumaric acid, and tricarboxy ethylene. As used herein, the term "carboxylic acid" includes the polycarboxylic acids and those acid anhydrides, such as maleic anhydride, wherein the anhydride group is formed by the elimination of one molecule of water from two carboxyl groups located on the same polycarboxylic acid molecule. Maleic anhydride and other acid anhydrides useful herein have the general structure

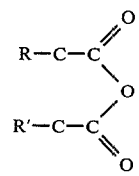

wherein R and R' are selected from the group consisting of hydrogen, halogen and cyanogen ($-C\equiv N$) groups and alkyl, aryl, alkaryl, aralkyl, and cycloalkyl groups such as methyl, ethyl, propyl, octyl, decyl, phenyl, tolyl, xylyl, benzyl, cyclohexyl, and the like.

The preferred carboxylic monomers for use in this invention are the monoolefinic acrylic acids having the general structure

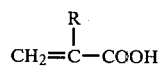

wherein R is a substituent selected from the class consisting of hydrogen, halogen, and the cyanogen ($-C\equiv N$) groups, monovalent alkyl radicals, monovalent aryl radicals, monovalent aralkyl radicals, monovalent alkaryl radicals and monovalent cycloaliphatic radicals. Of this class, acrylic and methacrylic acid are most preferred because of generally lower cost, ready availability and ability to form superior polymers. Another useful carboxylic monomer is maleic anhydride or the acid.

The polymers contemplated include both homopolymeric carboxylic acids or anhydrides thereof, or the defined carboxylic acids copolymerized with one or more other vinylidene monomers containing at least one terminal $CH_2=CH<$ group. Such materials include, for example, acrylic ester monomers including those acrylic ester monomers having long chain aliphatic groups such as derivatives of an acrylic acid represented by the formula

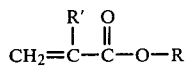

wherein R is an alkyl group having from 10 to 30 carbon atoms, preferably 10 to 20 carbon atoms and R' is hydrogen or a methyl or ethyl group, present in the copolymer in amount, for example, from about 1 to 30 weight percent, and for some uses more preferably, about 5 to 15 weight percent. Representative higher alkyl acrylic esters are decyl acrylate, isodecyl methacrylate, lauryl acrylate, stearyl acrylate, behenyl acrylate and melissyl acrylate and the corresponding methacrylates. Mixtures of two or three or more long chain acrylic esters may be successfully polymerized with one of the carboxylic monomers to provide useful thickening resins of this invention. A useful class of copolymers are those methacrylates where the alkyl group contains 16 to 21 carbon atoms present in amounts of about 5 to 15 weight percent of the total monomers. For example, polymers have been made with 15±5 weight percent isodecyl methacrylate, 10±3 weight percent lauryl methacrylate, 7±3 weight percent stearyl methacrylate, with acrylic acid.

Other acrylic esters contemplated are also derivatives of an acrylic acid used in amounts, for example, of about 5 to 30 weight percent represented by the formula

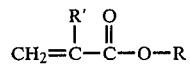

wherein R is an alkyl, alkoxy, haloalkyl, cyanoalkyl, and like groups having from 1 to 9 carbon atoms and R' is hydrogen or a methyl or ethyl group. These acrylic esters are present in the copolymer for some uses in amount from about 5 to 30 weight percent and more preferably from about 5 to 25 weight percent. Representative acrylates include methyl acrylate, ethyl acrylate, propyl acrylate, isopropyl acrylate, butyl acrylate, isobutyl acrylate, methyl methacrylate, methyl ethacrylate, ethyl methacrylate, octyl acrylate, heptyl acrylate, octyl methacrylate, isopropyl methacrylate, 2-ethylhexyl acrylate, nonyl acrylate, hexyl acrylate, n-hexyl methacrylate, and the like. Mixtures of these two classes of acrylates provide useful copolymers.

The polymers also may be cross-linked with any polyfunctional vinylidene monomer containing at least 2 terminal $CH_2=C<$ groups, including for example, butadiene, isoprene, divinyl benzene, divinyl naphthalene, allyl acrylates and the like. A particularly useful cross-linking monomer for use in preparing the copolymers, if one is employed, is a polyalkenyl polyether having more than one alkenyl ether grouping per molecule. The most useful possess alkenyl groups in which an olefinic double bond is present attached to a terminal methylene grouping, $CH_2=C<$. They are made by the etherification of a polyhydric alcohol containing at least 4 carbon atoms and at least 3 hydroxyl groups. Compounds of this class may be produced by reacting an alkenyl halide, such as allyl chloride or allyl bromide with a strongly alkaline aqueous solution of one or more polyhydric alcohols. The product is a complex mixture of polyethers with varying numbers of ether groups. Analysis reveals the average number of ether groupings on each molecule. Efficiency of the polyether cross-linking agent increases with the number of potentially polymerizable groups on the molecule. It is preferred to utilize polyethers containing an average of two or more alkenyl ether groupings per molecule. Other cross-linking monomers include for example, diallyl esters, dimethallyl ethers, allyl or methallyl acrylates and acrylamides, tetraallyl tin, tetravinyl silane, polyalkenyl methanes, diacrylates and dimethacrylates, divinyl compounds as divinyl benzene, polyallyl phosphate, diallyloxy compounds and phosphite esters and the like. Typical agents are allyl pentaerythritol, allyl sucrose, trimethylolpropane triacrylate, 1,6-hexanediol diacrylate, pentaerythritol triacrylate, tetramethylene dimethacrylate, tetramethylene diacrylate, ethylene diacrylate, ethylene dimethacrylate, triethylene glycol dimethacrylate, and the like. Allyl pentaerythritol and allyl sucrose provide excellent polymers in amounts less than 5, as 3.0 weight percent. Cross-linking of the polymers provides improved ability for the copolymers to swell under a confining pressure.

When the optional cross-linking agent is present, the polymeric mixtures usually contain up to about 5% by weight of cross-linking monomer based on the total of carboxylic acid monomer, plus other monomers, if present and more preferably 0.1 to 2.0 weight percent.

Other preferred monomers are used, particularly in conjunction with acrylic esters, including the acrylic nitriles, $\alpha,\beta$-Olefinically unsaturated nitriles useful in the interpolymers embodied herein are preferably the monoolefinically unsaturated nitriles having from 3 to 10 carbon atoms such as acrylonitrile, methacrylonitrile, ethacrylonitrile, chloroacrylonitrile, and the like. Most preferred are acrylonitrile and methacrylonitrile. The amounts used are, for example, for some polymers are from about 5 to 30 weight percent of the total monomers copolymerized.

The acrylic amides include monoolefinically unsaturated amides which may be incorporated in the interpolymers of this invention having at least one hydrogen on the amide nitrogen and the olefinic unsaturation is alpha-beta to the carbonyl group. Representative amides include acrylamide, methacrylamide, N-methyl acrylamide, N-t-butyl acrylamide, N-cyclohexyl acrylamide, N-ethyl acrylamide and others. Very much preferred are acrylamide and methacrylamide used in amounts, for example, from about 1 to 30 weight percent of the total monomers copolymerized. Other acrylic amides include N-alkylol amides of alpha, beta-olefinically unsaturated carboxylic acids including those having from 4 to 10 carbon atoms such as N-methylol acrylamide, n-ethanol acrylamide, n-propanol acrylamide, n-methylol methacrylamide N-ethanol methacrylamide, N-methylol maleimide, N-methylol maleamide, N-methylol maleamic acid, N-methyl maleamic acid esters, the N-alkylol amides of the vinyl aromatic acids such as N-methylol-p-vinyl benzamide, and the like and others. The preferred monomers of the N-alkylol amide type are the N-alkylol amides of alpha, beta-monoolefinically unsaturated monocarboxylic acids and the most preferred are N-methylol acrylamide and N-methylol methacrylamide used in amounts for example of about 1 to 20 weight percent. N-alkoxymethyl acrylamides also may be used. It is thus intended that where references are made herein regarding the essential N-substituted alkoxymethyl amides, the term "acrylamide" includes "methacrylamide" within its meaning. The preferred alkoxymethyl acrylamides are those wherein $R_6$ is an alkyl group containing from 2 to 5 carbon atoms and useful is N-butoxymethyl acrylamide.

These copolymers may include as little as 8 weight percent of the total polymer of a carboxyl containing monomer, up to 100%, i.e. homopolymer. A useful range of materials include those containing about 8 to 70 weight percent carboxyl containing monomer, with 92 to 30 weight percent of other vinylidene comonomers as described.

Other vinylidene comonomers generally include in addition to those described above, at least one other olefinically unsaturated monomer, more preferably at least one other vinylidene monomer (i.e., a monomer containing at least one terminal $CH_2=CH<$ group per molecule) copolymerized therewith, for example up to about 30% or more by weight of the total monomers. Suitable monomers include α-olefins containing from 2 to 12 carbon atoms, more preferably from 2 to 8 carbon atoms, such as ethylene, propylene, 1-butene, isobutylene, 1-hexane, 4-methyl-1-pentene and the like; dienes containing from 4 to 10 carbon atoms including conjugated dienes as butadiene, isoprene, piperylene and the like; ethylidene norbornene and dicyclopentadiene; vinyl esters and allyl esters such as vinyl acetate, vinyl chloroacetate, vinyl propionate, vinyl butyrate, vinyl laurate, vinyl benzoate, allyl acetate and the like; vinyl aromatics such as styrene, α-methyl styrene, chlorostyrene, vinyl toluene, vinyl naphthalene and the like; vinyl and allyl ethers and ketones such as vinyl methyl ether, allyl methyl ether, vinyl isobutyl ether, vinyl n-butyl ether, vinyl chloroethyl ether, methyl vinyl ketone and the like; vinyl nitriles such as acrylonitrile, methacrylonitrile and the like; cyanoalkyl acrylates such as α-cyanomethyl acrylate, the α-, β- and -cyanopropyl acrylates and the like; vinyl halides and vinyl chloride, vinylidene chloride and the like, halovinylates such as acrylate, ethyl acrylate, chloropropyl acrylate, cyclohexyl acrylate, phenyl acrylate, glycidyl acrylate, methoxyethyl acrylate, ethoxyethyl acrylate, hexylthioethyl acrylate, glycidyl methacrylate and the like wherein the alkyl groups contain 1 to 12 carbon atoms, and including esters of maleic and fumaric acid and the like; divinyls, diacrylates and other polyfunctional monomers such as divinyl benzene, divinyl ether, diethylene glycol diacrylate, ethylene glycol dimethacrylate, methylene-bis-acrylamide, allylpentaerythritol, and the like; and bis(β-haloalkyl) alkenyl phosphonates such as bis(β-chloroethyl) vinyl phosphonate and the like. Copolymers wherein the carboxyl containing monomer is a minor constituent, and the other vinylidene monomers are present on major components are readily prepared in accordance with the process of this invention.

Polymerization of the monomer in the solvent medium is usually carried out in the presence of a free radical catalyst in a closed vessel in an inert atmosphere and under autogenous pressure or artificially-induced pressure, or in an open vessel under reflux at atmospheric pressure. Temperature of the polymerization may be varied from about 0° to 100° C. or lower or higher, depending to a degree on the molecular weight desired in the polymer. Polymerization at 50° to 90° C. under autogenous pressure using a free radical catalyst is generally effective in producing a polymer yield of 75% to 100%. Typical free radical forming catalysts include peroxygen compounds such as sodium, potassium and ammonium persulfates, caprylyl peroxide, benzoyl peroxide, hydrogen peroxide, pelargonyl peroxide, cumene hydroperoxides, tertiary butyl diperphthalate, tertiary butyl perbenzoate, sodium peracetate, sodium percarbonate, and the like as well as azo diisobutyryl nitrile, hereinafter referred to as azoisobutyronitrile. Other catalyst utilizable are the so-called "redox" type of catatlyst and the heavy-metal activated catalyst systems. Ultra-violet light may also be used as a source of free radicals. Some systems polymerize solely by heat, but catalysts provide better control. The monomer may be batch charged or continuously added during the course of polymerization or by any other manner of polymerization techniques conventionally used.

An essential feature of the invention is the neutralization of at least part of the carboxyl groups to prevent gelling of the polymer with a group 1-A metal compound as the hydroxide, oxide or carbonate and the like including, for example, lithium, sodium, potassium, cesium and the like; as well as reaction with ammonia; and certain amines including morpholine, mono, di and triethanolamine, mono propanolamine, and other amines where the partial polymeric salt is less soluble in the defined medium to high hydrogen bonding solvents than the acid polymer form. Some exchange to obtain the desired salt is also feasible.

Preferably greater than 1 weight percent of the carboxyl groups and monomer are neutralized or formed into a salt of the above listed materials. More preferably, greater than 3 weight percent, up to about 50 weight percent of the carboxyl groups are neutralized or converted to the equivalent salt prior to polymerization. A particularly useful range is from greater than 5 to about 25 weight percent of the carboxyl groups in the carboxyl monomers to be neutralized. It is understood, that if desired, the carboxyl groups may be restored by removal of the alkali ion after polymerization is complete. Normally, polar and medium to strongly hydrogen bonded solvents are not suitable as solvents for carboxyl containing polymers free of the salts because they swell the free acid containing polymers to difficult to process gels.

The solvents used are those normally liquid at room temperature (25° C.) and are moderate to strongly hydrogen bonded, such as ketones, esters and alcohols. Such solvents normally have solubility parameters of greater than about 8 up to about 15, preferably esters, alcohols and ketones having solubility parameters of about 8.5 to about 14.5. Solubility parameters and lists of solvents are described in the article "Solubility Parameters", Harry Burrell, *Interchemical Review*, Vol. 14, Spring 1955, #1, pps. 3–16 and September 1955, #2, pps. 31–46. The solvents must have, in addition to the solubility parameters recited, certain hydrogen bonding capacity. These values and lists of solvents are described in the paper, "Quantification of the Hydrogen Bonding Parameters", E. P. Lieberman, *Official Digest*, January 1962, pps. 30–50, The hydrogen bonding No. should range from about 0.7 to 1.7. Solvents with solubility parameters outside the preferred range, in accordance with this invention, include for example, mineral spirits, pentene, hexane, heptane, octane and the like, methyl cyclohexane and diethyl ether. While such materials as ethyl benzene, xylene, toluene benzene, carbon tetrachloride, chloroform, trichloroethylene, tetrachloroethylene, and like halogenated hydrocarbons have solubility parameters within the defined range, such materials are poorly hydrogen bonded and are not satisfactory solvents in accordance with the improved, novel process of this invention. Benzene, for example, has a hydrogen bonding No. of 0.3, chlorobenzene 0.3, chloroform 0.3, cyclohexane 0.3, 1,2-dichloroethylene 0.3, 2,2-dichloropropane 0.3, ethylbenzene 0.3, hexane 0.0, nitrobenzene 0.3, n-propylbromide 0.3, xylene 0.3.

This is in accordance with the invention, as the preferred solvents as defined above exclude generally poorly hydrogen bonded solvents including hydrocarbons, chlorinated hydrocarbons and nitrohydrocarbons. Included within the scope of the invention are moderately hydrogen bonded solvents including most ketones, esters, some ethers and the strongly hydrogen bonded solvents such as alcohol. The examples of moderately bonded solvents including their solubility parameters are methyl acetate 9.6, ethyl acetate 9.1, methyl ethyl ketone 9.3, dioxane 9.9, methyl propyl ketone 8.7, methyl cellosolve 10.8, butyl propionate 8.8, cyclohexanone 9.9, carbitol 9.6, and the like. Strongly hydrogen bonded materials include for example methanol 14.5, ethanol 12.7, isopropanol 11.5, n-propanol 11.9, sec. butanol 10.8, tert butanol 10.6, 2-ethylbutanol 10.5, cyclohexanol 11.4, ethylene glycol 14.2, and the like, usually in the range of 8.5 to 12. Suitable solvents having both defined solubility parameters and hydrogen bonding parameters are listed in the articles referred to hereinabove which are incorporated herein and made a part hereof. Particularly useful are moderately hydrogen bonded ketone, ester and alcohol solvents having solubility parameters of about 9 to 11.

The invention will now be more fully described in the following specific examples, which are intended as being illustrative only, of the preparation of several types of polymers using various proportions of monomers and polymerization media. Solution viscosities of the polymer in water are measured with an RVT model Brookfield viscometer.

EXAMPLE I

Into a reaction vessel equipped with a thermometer, stirrer and reflux condenser there was charged 352 grams of ethyl acetate and 40 grams of acrylic acid. 4.18 grams of a 50% solution of sodium hydroxide was then added to the stirred reaction to neutralize 7.83% of the acrylic acid carboxyl groups. This mixture was then heated to reflux temperature of about 70° C., flushed with nitrogen, and 0.18 gram of allylpentaerythritol (APE) dissolved in a small amount of ethyl acetate and 0.07 grams of lauroyl peroxide was added. After about 1 hour of polymerization a mixture of 200 grams of acrylic acid, 8.7 grams sodium hydroxide, 8.7 grams of water, 0.7 grams allyl pentaerythritol and 0.3 grams of lauroyl peroxide were proportioned into the reactor over a three hour period to a conversion of about 90%. This resulted in a fine suspension of about 36 weight percent polymer in the ethyl acetate. The polymer was isolated and dried. Examples of the polymer were dissolved in water in 1, and 0.5 weight percent solutions and neutralized with sodium hydroxide to a pH of 7. The Brookfield Viscometer values at 20 rpm in centipoises was 48,500 for the 1% solution, and 6,800 for the 0.5% solution.

When this example is repeated with 100% acrylic acid whereby none of the carboxyl groups have been converted to a salt, after 80% conversion of monomers to polymer there is obtained a hard, rubbery mass in the reactor in contrast to polymerizations wherein 7% of the carboxyl groups of the acrylic acid have been converted to the sodium salt where after more than 80% conversion of monomer to polymer there is obtained a fluid fine polymer suspension, even at a total solids of 20 weight percent copolymer. The polymerization may be conducted beginning with none of the carboxyl groups converted to a salt so long as a mole percent of the carboxyl group in amount up to greater than 1%, more preferably greater than 3%, is continuously or intermittently neutralized and/or converted to the salt form at a rate substantially equivalent to the polymerization rate. Obviously when one begins a polymerization with some of the carboxyl groups converted to the salt form, additional neutralization continuously or intermittently may take place during the course of the polymerization, but more probably and for ease of operation, the polymerization reaction is begun when more than 1 and preferably more than about 3 weight percent of the carboxyl groups of the acid monomers are converted into a salt form in order to obtain the optimum advantages of the invention.

EXAMPLE II

A series of polymerizations were conducted in small sealed reactors. The total amount of ethyl acetate and acrylic acid used was about 15 grams. In the table following hereinafter the parts per 100 of acrylic acid will be recited for the allylpentaerythritol and the catalyst. In these examples the acrylic acid was neutralized with 50% NaOH sol. to 7% neutralization and this mixture was charged to the reactors. This resulted in 4.35 phm $H_2O$ contained during polymerization. The polymerizations were conducted at the temperature and the times indicated in the Table, along with the resulting recovered yield of polymer. The Brookfield Viscometer values at 20 rpm for water mucilages at pH 7 were also set forth. The catalysts will be indicated as "L" for lauroyl peroxide and "S" for secondary sec. butyl peroxydicarbonate. PHM is weight parts per hundred of monomer.

TABLE I

| RUN NO. | APE PHM | CATALYST TYPE | CATALYST PHM | $H_2O$ PHM | POLYMERIZ. TEMPERATURE | MONOMER CONCENTRATION | POLYMERIZ. TIME (IN MINUTES) | YIELD % POLYMER RECOVERED | BROOKFIELD VISCOMETER 1% | BROOKFIELD VISCOMETER 0.5% |
|---|---|---|---|---|---|---|---|---|---|---|
| 1 | 0.375 | L | 0.05 | 4.35 | 80° | 20% | 240 | 66.7 | 22,600 | 14,540 |
| 2 | 0.5 | L | 0.05 | 4.35 | 80° | 20% | 240 | 75.2 | 42,100 | 32,000 |
| 3 | 0.375 | S | 0.05 | 4.35 | 60° | 20% | 240 | 96.0 | 22,250 | 15,700 |
| 4 | 0.25 | L | 0.1 | 4.35 | 82° | 30% | 180 | 60.6 | 47,000 | 18,300 |
| 5 | 0.15 | L | 0.1 | 4.35 | 82° | 30% | 180 | 66.3 | 43,250 | 19,500 |
| 6 | 0.25 | L | 0.1 | 4.35 | 82° | 40% | 180 | 70.2 | 37,000 | 14,700 |

TABLE I-continued

| RUN NO. | APE PHM | CATALYST TYPE | CATALYST PHM | H₂O PHM | POLYMERIZ. TEMPERATURE | MONOMER CONCEN- TRATION | POLYMERIZ. TIME (IN MINUTES) | YIELD % POLYMER RECOVERED | BROOKFIELD VISCOMETER 1% | BROOKFIELD VISCOMETER 0.5% |
|---|---|---|---|---|---|---|---|---|---|---|
| 7 | 0.15 | L | 0.1 | 4.35 | 82° | 40% | 180 | 73.8 | 30,750 | 10,700 |

EXAMPLE III

In these examples, rather than introducing water into the small polymerization reactors by neutralizing as above, a sample of acrylic acid was completely neutralized with sodium hydroxide solution, isolated and dried as a crystalline solid, then mixed with additional acrylic acid in amounts so that the mixture was equivalent to 7% neutralization of the acrylic acid carboxyl groups of the mixture and this mixture was charged to the reactors. The data is recorded in Table 2 in the manner set forth in Example 1 above.

TABLE II

| RUN NO. | APE PHM | CATALYST TYPE | CATALYST PHM | H₂O PHM | POLYMERIZ. TEMPERATURE | MONOMER CONCEN- TRATION | POLYMERIZ. TIME (IN MINUTES) | YIELD % POLYMER RECOVERED | WATER MUCILAGES, pH = 7 BROOKFIELD VISCOMETER 1% | WATER MUCILAGES, pH = 7 BROOKFIELD VISCOMETER 0.5% |
|---|---|---|---|---|---|---|---|---|---|---|
| 1 | 0.75 | L | 0.15 | 0.0 | 80° | 20% | 240 | 92.1 | 42,250 | 25,350 |
| 2 | 1.5 | S | 0.05 | 0.0 | 60° | 20% | 180 | 53.5 | 35,500 | 24,350 |
| 3 | 0.75 | S | 0.05 | 4.35* | 60° | 20% | 180 | 89.1 | 80,000 | 38,800 |

*H₂O Added Before Polymerization.

EXAMPLE IV

Another example was run following the procedure of Examples II and III wherein allyl sucrose (not APE) in amount of 0.5 PHM was used with 0.15 PHM of lauroyl peroxide with sodium acrylate mixed with acrylic acid, at a polymerization temperature, of 82° C., in a monomer concentration in ethyl acrylate of 20%, for 208 minutes. The recovered yield of polymer was 72.3%. The Brookfield viscosity of a 1% solution was 23,750 cps and the 0.5% solution viscosity was 16,200 cps.

EXAMPLE V

To a one (1) quart reactor there was added 11.6 grams of anhydrous potassium carbonate and 83.0 grams of acrylic acid to convert 14.6 % of the carboxyl groups to the potassium salt form. 7.0 grams of lauryl methacrylate and 10.0 grams of methyl methacrylate in 300 grams of ethyl acetate were then added to the reactor. 25ml. of a 1% solution of lauroyl peroxide in ethyl acetate was added, and the solution deaerated with nitrogen for seven minutes and sealed. The reaction vessel was rotated at 22 r.p.m. in a constant temperature bath at 65° C. for 18 hours. After cooling, the non-swollen powder polymer particles were easily separated from the reaction medium by filtration and were vacuum dried at 70° C. for 24 hours. A yield of 108 grams was obtained. The total solids of the polymerization reaction mixture was 23.0%. With 15% of the acrylic acid polymerized in the potassium salt form, a total solid polymerization of 25% is easily stirrable, while with the free acid, total solid polymerizations of less than 20% total solids are nearly solid and extremely difficult to process. In an example with same amounts of water, for example, 12 parts per hundred of monomer the potassium acrylate level of the acrylic acid used is readily increased up to 26%. Acetone also may be used as the solvent, for example, when 7.5% of the carboxyl groups of the acrylic acid have been neutralized to the K salt.

EXAMPLE VI

A series of examples was run to demonstrate that other alkali metal salts of acrylic acid are readily effective in the process of this invention. In these examples 4% of the acrylic acid carboxyl groups were neutralized. The results of the polymerizations and viscosities of 0.5 to 1.0% aqueous solutions are set forth below:

TABLE III

| Run No. | 1 | 2 | 3 |
|---|---|---|---|
| Alkali salt | K | Na | Li |
| Temperature (°C.) | 77 | 77 | 77 |
| APE-PHM | 0.5 | 0.5 | 0.5 |
| Lauroyl Peroxide PHM | 0.15 | 0.15 | 0.15 |
| Weight % Solids | 20 | 20 | 20 |
| 0.5 Weight % Viscosity (cps.) | 26,600 | 20,650 | 11,200 |
| 1.0 Weight % Viscosity (cps.) | 35,950 | 33,500 | 16,900 |

In these examples, the water of neutralization was removed by running the reflex condensate through a molecular sieve before returning to the reactor.

EXAMPLE VIII

In this example allyl sucrose was used as the crosslinking agent for acrylic acid, and the polymers were prepared as in Example VI above. The acrylic acid was neutralized so that 4% of the carboxyl groups were in the potassium salt form. 1.1 phm of allyl sucrose was used and 0.4 phm of lauroyl peroxide. The polymerization temperature was 62° C. and the weight % solids was 13. The 0.5 weight percent viscosity in water (cps.) was 36,500 and the 1.0 weight percent viscosity (cps.) was 82,000.

EXAMPLE VIII

A series of solvents are used in this example to demonstrate the practice of the invention. A master batch was prepared with 93 weight parts acrylic acid, 7 weight parts sodium acrylate, 1.0 weight parts allyl pentaerythritol, 0.15 weight parts lauroyl peroxide and 0.78 weight parts of water. For the polymerization three weight parts of the master batch plus 12 weight parts of the solvents set forth in the table hereinbelow were added to polymerization vessel, flushed with nitrogen for 3 minutes, sealed and heated to 80° C. for a period of time to obtain greater than about 80 weight percent conversion of monomers to polymer. The resulting fine slurry of polymers were readily filtered and washed with 150 ml of ethyl acetate. The polymers were then dried at 80° C. for 30 minutes in a vacuum to constant weight. 1% mucilages were made in water overnight and neutralized to a pH of 7. Portions of the 1% mucilages were diluted to 0.5 and 0.2 weight percent. The results obtained were as follows:

TABLE IV

| RUN NO. | SOLVENT | SOLUBILITY PARAMETERS | TIME TO MAXIMUM POLYMERIZATION RATE - MINS. | % TOTAL SOLIDS | $V_{20}$ BROOKFIELD VISCOSITIES | | |
|---|---|---|---|---|---|---|---|
| | | | | | 1% | 0.5% | 0.2% |
| 1 | Ethyl acetate | 9.1 | 27 | 20 | 72,400 | 27,750 | 1,100 |
| 2 | Acetone | 10.0 | 28 | 20 | 47,500 | 16,100 | 565 |
| 3 | Isopropyl acetate | 8.4 | 68 | 20 | 62,000 | 38,000 | 2,785 |
| 4 | n-butyl acetate | 8.5 | 27 | 20 | 68,000 | 33,350 | 2,010 |
| 5 | Cellosolve acetate | 8.7 | 11 | 20 | 820 | 415 | 160 |
| 6 | Methyl ethyl ketone | 9.3 | 22 | 20 | 500 | — | — |
| 7 | Butyl Cellosolve | 8.0 | 12 | 20 | 10 | — | — |
| 8 | t-Butanol | 10.6 | 120 | 20 | 4,850 | 2,475 | 1,250 |
| 9 | t-Butanol | 10.6 | 25 | 40 | 50,000 | 5,900 | 20 |

While runs 6 and 7 did not result in polymers having efficient thickening properties these polymers have other uses and formed the desired finely suspended particles during the polymerization. One more polymerization was run with ethanol as the solvent, using 3 weight parts each of allyl pentaerythritol and lauroyl peroxide. A 3% solution of the resulting polymer had a Brookfield $V_{20}$ viscosity of 15,000.

If maximum thickening properties are desired in those carboxyl containing polymers having this property, additional neutralization to an alkali, ammonium or amine salt may be necessary. The neutralizing agent is preferably a monovalent alkali such as sodium, potassium, lithium, ammonium hydroxide, the carbonates and bicarbonates thereof, and the like or mixtures of the same, and also amine bases having not more than one primary or secondary amino group. Such amines include, for example, triethanolamine, ethanolamine, isopropanolamine, triethylamine, trimethyl amine, and the like. At least 30% of the acid, carboxyl, groups are generally neutralized to an ionic state, that is, —CO$_2$—M+. Preferably, about 50 to 90 weight percent of the acid groups are neutralized to —CO$_2$M for thickening purposes. The counter ion M+ is the alkali cation, the ammonia ion NH$_4$+ or quaternary cationic compounds resulting from the neutralization with an organic amine. Excellent results have been obtained with K+ and NH$_4$+.

I claim:

1. A process for preparing polymers of olefinically unsaturated polymerizable carboxylic acid monomers in a solvent consisting essentially of a moderate to strongly hydrogen bonded solvent having a hydrogen bonding number from about 0.7 to 1.7 and solubility parameters of greater than about 8 up to about 15 which comprises converting at least three weight percent of said carboxylic acid monomer to a salt by reaction with an alkali, ammonia or amine and wherein said acid monomer comprises at least 70 weight percent of total monomers being polymerized in said solvent.

2. A process for preparing polymers of unsaturated polymerizable carboxylic monomers which comprises polymerizing said acid monomers wherein said acid monomer comprises at least 70 weight percent of the total monomers being copolymerized, at least three weight percent of said carboxylic acid monomer being a salt of an alkali metal, ammonia or amine, in a polymerization medium solvent for said monomers which is a non-solvent for said polymers consisting essentially of a moderate to strongly hydrogen bonded ester or ketone solvent having a hydrogen bonding number from about 0.7 to 1.7 and a solubility parameter of greater than about 8 up to about 15 whereby said polymer is obtained in powdered form.

3. A process of claim 2 wherein said carboxylic monomer contains at least one activated carbon to carbon olefinic double bond and at least one carboxyl group.

4. A process of claim 3 wherein said carboxylic acid monomer is selected from the group consisting of acrylic acid, methacrylic acid, and maleic acid present in amount of at least 70 weight percent of the monomers being polymerized, at least 3 weight percent of said carboxylic acid monomers are in the form of an alkali metal or ammonium salt, and the solvent is a ketone or an ester having a solubility parameter of about 8.5 to about 14.5.

5. A process of claim 4 wherein said carboxylic acid monomer is copolymerized with at least one other vinylidene monomer containing at least one terminal CH$_2$=CH< group.

6. A process of claim 5 wherein said vinylidene monomer is an ester having the formula,

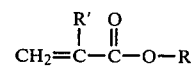

wherein R' is hydrogen or an alkyl group containing 1 to 6 carbon atoms and R is an alkyl group containing 1 to 30 carbon atoms.

7. A process of claim 6 wherein said carboxylic acid is acrylic acid and there is present at least one acrylic acid ester wherein R is an alkyl group containing 10 to 30 carbon atoms and at least one other acrylic acid ester wherein R contains 1 to 9 carbon atoms, each present in amounts less than about 20 weight percent each.

8. A process of claim 3 wherein there is copolymerized with said acid monomer a polymerizable crosslinking monomer containing CH$_2$=C< groups and at least one other olefinic polymerizable grouping, the unsaturated bonds of said polymerizable grouping being nonconjugated with respect to the other.

9. A process of claim 4 wherein there is copolymerized with said acid monomer a polymerizable crosslinking monomer containing $CH_2=C<$ groups and at least one other olefinic polymerizable grouping, the unsaturated bonds of said polymerizable grouping being nonconjugated with respect to the other.

10. A process of claim 8 wherein said crosslinking monomer comprises a polyalkenyl polyether of polyhydric alcohol containing more than one alkenyl group per molecule and wherein the polyhydric alcohol contains at least 4 carbon atoms and at least 3 hydroxyl groups.

11. A process of claim 10 wherein said crosslinking monomer is a monomeric polyether of an oligosaccharide and the hydroxyls are etherified with allyl groups.

12. A process of claim 6 wherein there is polymerized from 70 to 87 weight percent of the carboxylic acid monomer, 2 to 20 weight percent of an acrylic ester wherein R contains 10 to 30 carbon atoms and 5 to 30 weight percent of an acrylic ester wherein R contains 1 to 9 carbon atoms.

13. A process of claim 6 wherein there is polymerized from 70 to 87 weight percent of the carboxylic acid monomers, 2 to 20 weight percent of an acrylic ester wherein R contains 10 to 30 carbon atoms and 5 and 30 weight percent of at least one other acrylic or methacrylic nitrile or amide.

14. A process of claim 12 wherein the acrylic ester is isodecyl methacrylate, lauryl methacrylate or stearyl methacrylate.

15. A process of claim 11 wherein the crosslinking monomer is allyl sucrose.

16. A process of claim 11 wherein the crosslinking monomer is allylpentaerithritol.

17. A process of claim 11 wherein the carboxylic acid is from 70 to 95 weight percent acrylic acid, the acrylic ester is selected from the group consisting of lauryl acrylate, stearyl acrylate and stearyl methacrylate, from about 1 to 3 weight percent of a crosslinking monomer containing $CH_2=C<$ grouping and at least one other olefinic polymerizable grouping, the unsaturated bonds of said polymerizable grouping being nonconjugated with respect to each other.

18. A process of claim 4 wherein said ester solvent is an alkyl ester wherein the alkyl group contains 1 to 4 carbon atomms and that portion of the ester normally derived from an acid contains 2 to 6 carbon atoms.

19. A process of claim 18 wherein said ester is an alkyl acetate wherein the alkyl group contains 1 to 4 carbon atoms.

20. A process of claim 19 wherein said salt is 5 to 20 weight percent of potassium salt and the alkyl acetate is ethyl acetate.

21. A process of claim 4 wherein said solvent has solubility parameters of 8.5 to 12.

22. A process of claim 10 wherein said solvent has a solubility parameter of 8.5 to 12 and the salt is a potassium salt in amount of about 5 to 25 weight percent of the carboxyl groups in the potassium salt form.

23. A process of claim 22 wherein said solvent has a solubility parameter of 9 to 11.

24. A process of claim 23 wherein said solvent is ethyl acetate and the alkali is potassium present in amount greater than about 4 weight percent of the total carboxyl groups in the carboxyl monomer.

* * * * *